(12) United States Patent
Schaaf

(10) Patent No.: US 11,668,057 B2
(45) Date of Patent: Jun. 6, 2023

(54) MATERIAL TRANSFER APPARATUS FOR A GROUND MILLING MACHINE AND GROUND MILLING MACHINE HAVING SUCH A MATERIAL TRANSFER APPARATUS

(71) Applicant: BOMAG GMBH, Boppard (DE)

(72) Inventor: Matthias Schaaf, Boppard (DE)

(73) Assignee: BOMAG GMBH, Boppard (DE)

( * ) Notice: Subject to any disclaimer, the term of this patent is extended or adjusted under 35 U.S.C. 154(b) by 79 days.

(21) Appl. No.: 17/249,104

(22) Filed: Feb. 19, 2021

(65) Prior Publication Data
US 2021/0261343 A1  Aug. 26, 2021

(30) Foreign Application Priority Data
Feb. 21, 2020  (DE) ...................... 10 2020 001 163.2

(51) Int. Cl.
*E01C 23/088* (2006.01)
*B65G 15/12* (2006.01)
(Continued)

(52) U.S. Cl.
CPC ............ *E01C 23/088* (2013.01); *B65G 15/12* (2013.01); *B65G 47/44* (2013.01); *E01C 23/127* (2013.01); *E01C 2301/00* (2013.01)

(58) Field of Classification Search
CPC .. E01C 23/088; E01C 23/127; E01C 2301/00; B65G 15/12; B65G 41/002; B65G 47/44; B65G 11/166
USPC ................... 193/22, 2 R, 3, 4, 5, 15, 16, 17; 198/311, 312, 313, 314, 315, 316.1, 317, 198/318, 319, 320, 560
See application file for complete search history.

(56) References Cited

U.S. PATENT DOCUMENTS 1,583,572 A * 5/1926 Burton .................. E21F 13/063
198/315
3,744,615 A * 7/1973 Plaquet .................. B65G 65/28
198/585
(Continued)

FOREIGN PATENT DOCUMENTS

DE     102009013709     1/2011
DE     102012019016     4/2014
(Continued)

*Primary Examiner* — Abby J Flynn
*Assistant Examiner* — Michael A Goodwin
(74) *Attorney, Agent, or Firm* — Grossman, Tucker, Perreault & Pfleger, PLLC

(57) ABSTRACT

A material transfer apparatus for transferring milled material for a ground milling machine, having a loading conveyor for discharging the milled material, a transfer conveyor for transporting the milled material onto the loading conveyor, and a transfer apparatus for transferring the milled material from the transfer conveyor into a receiving opening of a receiving apparatus of the loading conveyor, wherein the loading conveyor is swivel-mounted about a vertical swivel axis and about a horizontal swivel axis, and wherein the vertical swivel axis and the horizontal swivel axis intersect at an intersection point, wherein the horizontal swivel axis is arranged in vertical direction above the loading conveyor, in particular above the upper run of the loading conveyor. Moreover, a ground milling machine having such a material transfer apparatus.

20 Claims, 8 Drawing Sheets

(51) Int. Cl.
*E01C 23/12* (2006.01)
*B65G 47/44* (2006.01)

(56) References Cited

U.S. PATENT DOCUMENTS

| | | | |
|---|---|---|---|
| 3,802,525 A | | 4/1974 | Snow, Jr. et al. |
| 4,712,962 A | * | 12/1987 | Johnston ................ B65G 47/44 |
| | | | 414/744.5 |
| 5,190,140 A | * | 3/1993 | Buschbom .......... A01F 25/2009 |
| | | | 37/255 |
| 10,227,740 B2 | | 3/2019 | Verhaelen et al. |
| 10,428,471 B1 | | 10/2019 | Hirman et al. |
| 11,192,730 B1 | * | 12/2021 | Schlenker ............ B65G 47/766 |
| 2014/0084665 A1 | * | 3/2014 | Motz .................... E01C 23/127 |
| | | | 198/606 |
| 2014/0183003 A1 | | 7/2014 | Jorgensen et al. |

FOREIGN PATENT DOCUMENTS

| | | | | |
|---|---|---|---|---|
| EP | 3115508 | | 1/2017 | |
| WO | WO-2010045952 A1 | * | 4/2010 | ........... E01C 23/088 |

\* cited by examiner

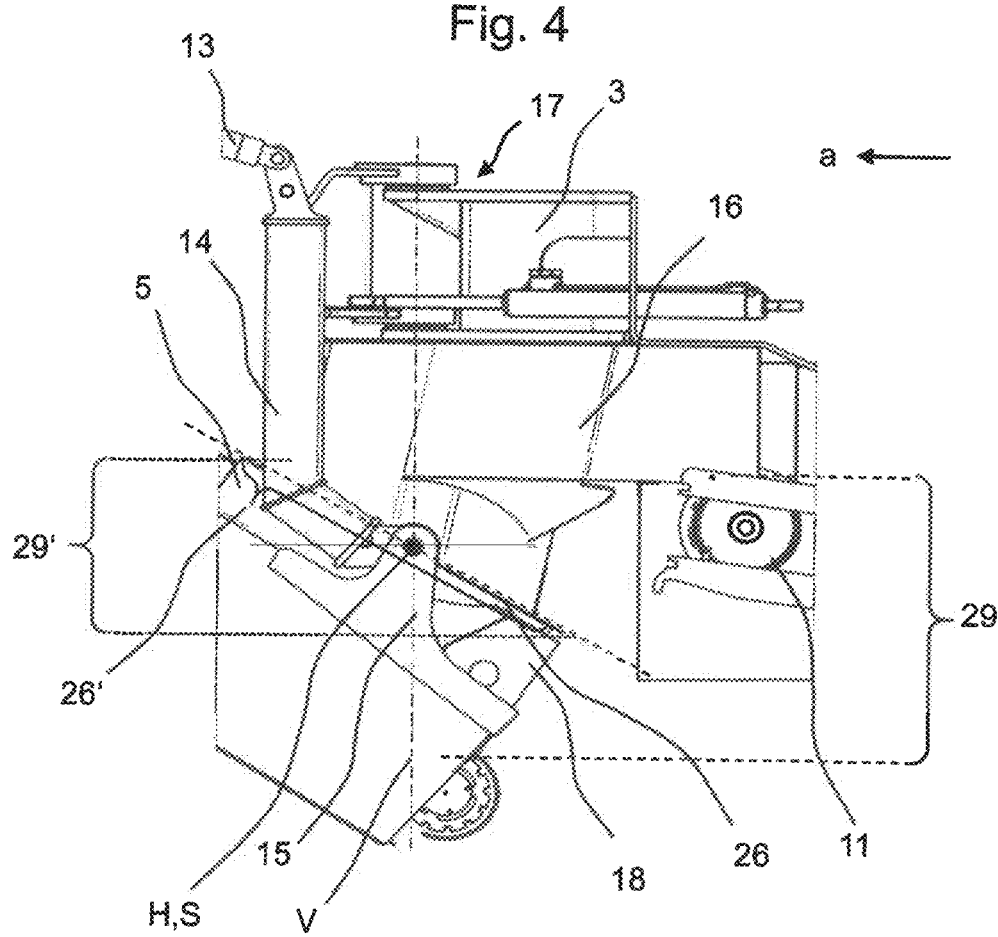
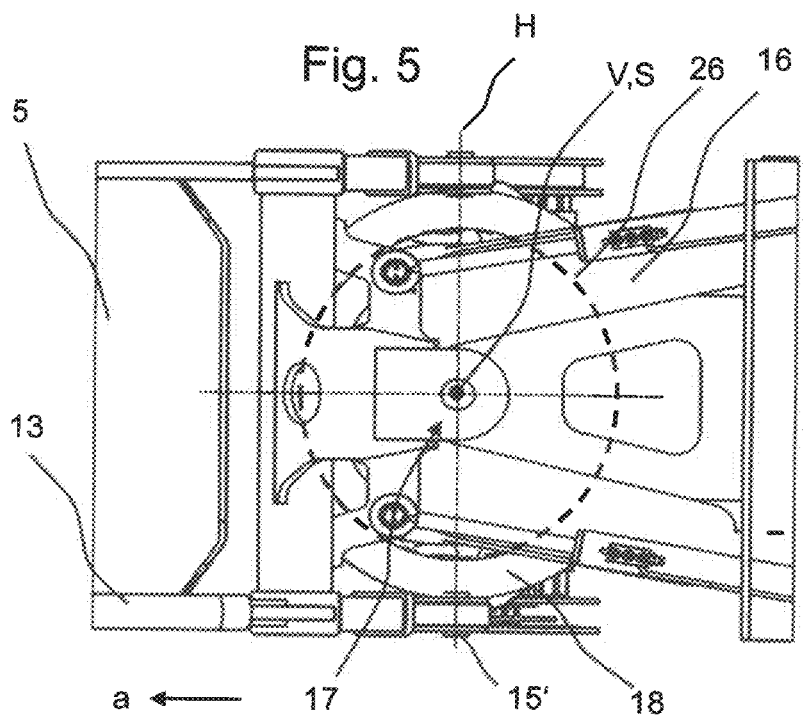

Fig. 11
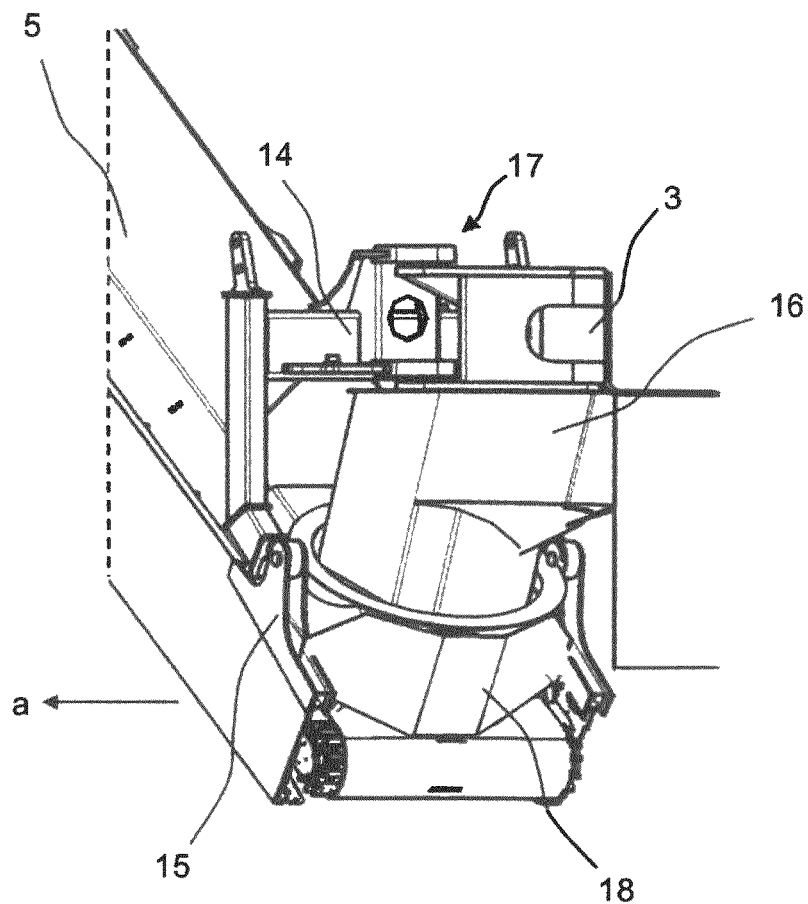
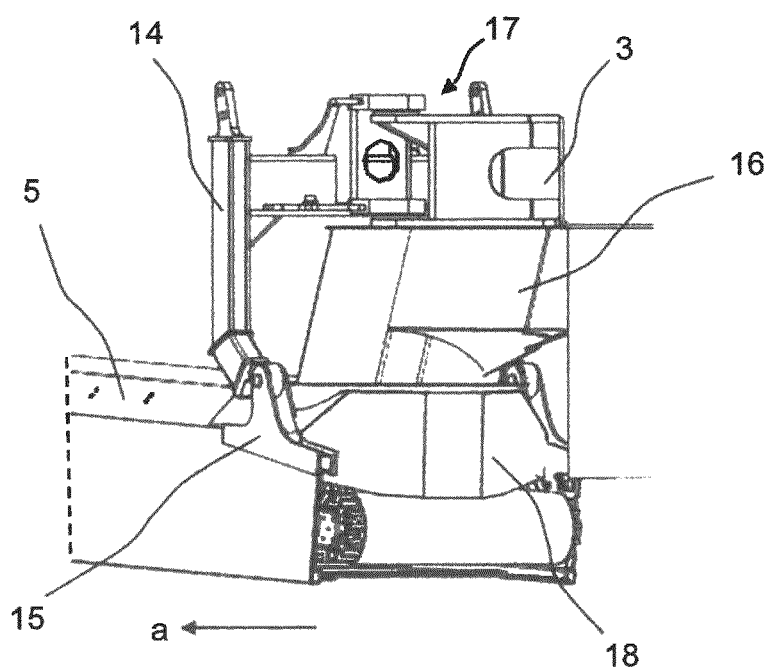
Fig. 12

MATERIAL TRANSFER APPARATUS FOR A GROUND MILLING MACHINE AND GROUND MILLING MACHINE HAVING SUCH A MATERIAL TRANSFER APPARATUS

FIELD

The invention relates to a material transfer apparatus for transferring milled material for a ground milling machine. Moreover, the invention relates to a ground milling machine, in particular a road milling machine, having such a material transfer apparatus.

BACKGROUND

Ground milling machines, especially road milling machines, are used, for example, to remove damaged roads or to mine mineral resources. For this purpose, they have a machine frame which frequently has height-adjustable travel units, which can be wheels or crawler tracks, for example. The energy source is typically a drive motor, for example a diesel combustion engine. The operator controls the ground milling machine from an operator platform. The primary working unit of a ground milling machine comprises a milling drum rotatably mounted in a milling drum box. The milling drum may be configured as an essentially hollow cylinder with milling chisels arranged on its outer shell surface. In operation, the milling drum is set in rotation about a rotation axis, which is usually essentially horizontal and transverse to the working direction, causing the milling chisels to mill off ground material. The loosened milled material needs to be removed from the milling drum box. For this purpose, a transfer conveyor is typically arranged on the ground milling machines, which receives the milled material from the milling drum box and transports it, for example, through the machine interior to the front or to the rear. A loading conveyor is located at the front or rear end of the ground milling machine in the working direction. The transfer conveyor is configured to transport the milled material from the milling drum box to the loading conveyor. The loading conveyor, in turn, transports the milled material to a discharge point, where the milled material is transferred to a transport vehicle for removal, for example. The conveyors usually comprise a support structure, a drive roller, a deflection roller, optionally one or more idlers, and a conveyor belt surrounding the drive roller and the deflection roller. The conveyors are usually arranged ascending or inclined towards one side in vertical direction. The drive roller, which is driven by a drive device, for example a hydraulic motor, is usually located on the support structure close to the loading point of the milled material onto the respective conveyor. The deflection roller, on the other hand, is often located at that end of the conveyor where the milled material is discharged from the conveyor belt. The conveyor belt is arranged such that it circulates endlessly around the drive roller and the deflection roller and is usually arranged in such a way that the upper run runs from the drive roller to the deflection roller. Idlers may be arranged between the drive roller and the deflection roller. The upper run is herein defined as the part of the conveyor belt that forms the upper part in vertical direction between the drive roller and the deflection roller; the lower run, on the other hand, is defined as the part of the conveyor belt that forms the lower part of the conveyor belt in vertical direction between the drive roller and the deflection roller. Thus, the upper run is usually the carrier run, and the lower run is usually the return run.

For the complete removal of the loosened milled material, it is important that in particular the transfer of the milled material from the transfer conveyor to the loading conveyor takes place as efficiently and loss-free as possible. Also with regard to the fact that neither the operator of the ground milling machines nor other persons in the vicinity of the machine should be endangered by dust, noise or milled material escaping from the ground milling machine, for example at the transition from one conveyor to the other, a loss-free transfer of the milled material between the conveyors is important. The transfer is made more difficult by the fact that at least the loading conveyor is typically mounted so that it can swivel about a vertical swivel axis and about a horizontal swivel axis. In this way, the position of the discharge point of the loading conveyor can be adjusted vertically in height as well as laterally or horizontally. In order to ensure that the milled material is transferred between the transfer conveyor and the loading conveyor in a loss-free manner, transfer apparatuses are therefore typically provided for transferring the milled material from the transfer conveyor into a receiving opening of a receiving apparatus of the loading conveyor. For example, rubber mats are typically provided on the transfer conveyor to direct the fall of the milled material from the transfer conveyor onto the loading conveyor. Moreover, there is typically a funnel on the loading conveyor, which catches the falling milled material and directs it onto the loading conveyor. The transfer apparatus thus refers in particular to that part of the overall conveyor device which is arranged in the conveying direction between the discharge point of the milled material of the transfer conveyor and the receiving point for the milled material on the loading conveyor and ensures a defined material flow in this region.

In order to ensure the tightness of the material transfer apparatus during the transfer of the milled material from the transfer conveyor to the loading conveyor towards the outside environment, various solutions are known in the prior art, for example ball hoods sliding along each other, as described in applicant's DE 10 2012 019 016 A1. Another prior art system is described, for example, in EP 3 115 508 A1. With these designs, the loss of material during the transfer between the conveyors of the ground milling machine has already been reduced. Particularly in the case of solutions with rubber mats hanging down, however, if the loading conveyor swivels sharply, especially to the sides, it is quite possible that gaps or free spaces to the outside may occur between the rubber mats, so that milled material and/or dust can escape to the outside. In addition, the components of the prior art transfer apparatuses are often severely deformed when the loading conveyor swivels, resulting in increased wear. In addition, the often complicated structure of the transfer point results in increased space requirements. The suspension of the loading conveyor on the ground milling machine must then often be designed very space-consuming as well, which, however, causes the loading conveyor to often swing back and forth during operation, so that milled material is sometimes scattered next to the transport vehicles.

SUMMARY

Against this background, it is the object of the present invention to provide a material transfer apparatus which, on the one hand, is particularly tight irrespective of the swivel position of the loading conveyor and efficiently contains the leakage of milled material, dust and noise at the transfer point between the conveyors. On the other hand, the structure of the material transfer apparatus should be as simple as possible, thus causing only low manufacturing costs and at the same time keeping the wear of the components used as low as possible. Another object is to reduce vibrations of the loading conveyor in order to avoid scattering losses.

The object is achieved with a material transfer apparatus and a ground milling machine according to the independent claims. Preferred embodiments are cited in the dependent claims.

Specifically, in a material transfer apparatus according to the above description, the solution is achieved by arranging the horizontal swivel axis in vertical direction above the loading conveyor at the level of the extension of the receiving opening of the receiving apparatus in vertical direction or above. First of all, it should thus be noted that the horizontal swivel axis should be arranged in vertical direction above the loading conveyor. This means in particular that the horizontal swivel axis is located above the upper run of the loading conveyor in vertical direction, i.e. above the lower end of the upper run in vertical direction. It should be noted that the loading conveyor rises obliquely towards the front, so that in particular, for example, the discharge point of the loading conveyor may be arranged significantly above the horizontal swivel axis. The position of the horizontal swivel axis in relation to the loading conveyor therefore refers to the vertical plane in which the horizontal swivel axis is located or in which the horizontal swivel axis extends. It also intersects the loading conveyor and especially its upper run. In this vertical plane, the horizontal swivel axis is arranged in vertical direction above the loading conveyor or the upper run of the loading conveyor. Thus, the arrangement of the horizontal swivel axis relative to the loading conveyor does not refer to every region of the loading conveyor, but only to that region which shares a vertical plane with the horizontal swivel axis (specifically in vertical direction below it). Furthermore, according to the invention, the horizontal swivel axis is not only located above the loading conveyor, but also at least at the level of the extension of the receiving opening of the receiving apparatus in vertical direction or above it. The level of the receiving opening of the receiving apparatus here refers to the total extension of the receiving opening in vertical direction, i.e. the region in vertical direction defined between the lower maximum point of the receiving opening in vertical direction and the upper maximum point of the receiving opening in vertical direction.

In the prior art, as disclosed, for example, in DE 10 2012 019 016 A1 and EP 3 115 508 A1, the horizontal swivel axis of the loading conveyor is often arranged at the level of the loading conveyor, for example the deflection roller of the loading conveyor that is located at the rear in the working direction. This was done because then, when the loading conveyor is swiveled about the horizontal swivel axis, its rear end remains almost stationary with respect to the transfer conveyor and also with respect to the machine frame of the ground milling machine. In this way, controlled transfer conditions were created for the milled material between the conveyors. A disadvantage of this, however, is that the receiving apparatus on the loading conveyor, for example the funnel typically used in the prior art, then moves back and forth with its receiving opening in a comparatively extensive manner, which overall results in a need for a comparatively space-consuming design of the material transfer apparatus. Moreover, a transfer apparatus arranged on the transfer conveyor needs to be configured in such a way that it can follow the corresponding movements of the funnel in order to convey the milled material into it as accurately as possible. This also leads to the problems of the prior art described at the beginning.

The invention is now based on the finding that movement of the rear end of the loading conveyor relative to the transfer conveyor or the machine frame of the ground milling machine is less important than previously thought. For example, it was found that a particularly advantageous transfer of the milled material from the transfer conveyor into the receiving opening of the receiving apparatus of the loading conveyor can be ensured if the movement of the receiving opening of the receiving apparatus is minimized during a swivel movement of the loading conveyor. For this, it is desirable that the horizontal swivel axis is positioned in vertical direction above the loading conveyor in a certain region. This is because, since the receiving opening of the receiving apparatus is located in vertical direction above the loading conveyor, the corresponding movements of the receiving opening can be reduced by also arranging the horizontal swivel axis in vertical direction above the loading conveyor, specifically in the region of the vertical extension of the receiving opening or above it. This means that it is accepted that the rear end of the loading conveyor, i.e. in particular in the region of the drive roller, will move more relative to the transfer conveyor when swiveling about the horizontal swivel axis. This was to be avoided in the prior art. On the other hand, however, the design according to the invention also achieves that the receiving opening of the receiving apparatus of the loading conveyor moves only very little during the swiveling process and is almost stationary with respect to the transfer conveyor or the machine frame of the ground milling machine. This in turn enables the milled material to be transferred from the transfer conveyor to the loading conveyor in a particularly precise manner and at the same time in a structurally very simple manner, since the receiving opening of the receiving apparatus on the loading conveyor, which is to be hit from the transfer conveyor, is practically stationary and does not make any extensive movements. The milled material can therefore essentially always be unloaded from the transfer conveyor at the same point and is nevertheless transported precisely into the receiving opening and thus onto the loading conveyor.

The advantages of the arrangement of the horizontal swivel axis according to the invention thus initially arise in a first step when the horizontal swivel axis is arranged within a certain region extending in vertical direction. This region to be aimed at according to the invention is not only above the loading conveyor or the upper run of the loading conveyor in vertical direction, but extends from the lowest point of the receiving opening in vertical direction to the highest point of the receiving opening in vertical direction. The arrangement of the horizontal swivel axis "above the loading conveyor" refers to the location of the loading conveyor already described above, which is in the same vertical plane in which the horizontal swivel axis extends. An alternative reference point is the deflection roller of the loading conveyor located at the rear in the working direction of the ground milling machine or in the conveying direction of the milled material on the loading conveyor. In this case, the region starts directly above the point of the upper run that is adjacent to the upper apex of this deflection roller in vertical direction. The region extends vertically upwards from here, for example to the transfer conveyor or the upper run of the transfer conveyor. It is therefore preferred that the horizontal swivel axis is arranged in vertical direction below the discharge point of the transfer conveyor, in particular in vertical direction below the highest point of the upper run of the transfer conveyor in vertical direction. In other words, the horizontal swivel axis is preferably arranged in vertical direction between the transfer conveyor (or its upper run or its highest point in vertical direction) and the loading conveyor (or its upper run or its lowest point of the upper run in vertical direction). However, the vertical plane in which the horizontal swivel axis extends does not necessarily intersect the transfer conveyor. Reference is therefore made above to the horizontal projection of the position of the transfer conveyor or its upper run in vertical direction onto that vertical plane in which the horizontal swivel axis extends. In particular, the deflection roller positioned at the front in the working direction of the ground milling machine or in the conveying direction of the milled material on the transfer conveyor is preferably taken as a reference here, so that the region in vertical direction extends to the point of the upper run of the transfer conveyor which is adjacent to the upper apex of this deflection roller in vertical direction. The advantages over the prior art already described above arise in particular in this region. It is further provided that the horizontal swivel axis is positioned not only above the upper run of the loading conveyor, as described above, but in addition at least at the level of the extension of the receiving opening of the receiving apparatus in vertical direction or above it. Positioning at the level of the extension of the receiving opening of the receiving apparatus in vertical direction is particularly preferred. This thus defines a vertical region bounded by the lowest point in vertical direction and the uppermost point in vertical direction of the receiving opening. This moves the horizontal swivel axis significantly further up in vertical direction compared to conventional arrangements. In this way, the improved sealing behavior between the loading conveyor and the transfer conveyor described above can be obtained, since this ultimately distributes the relative movement, in particular of the receiving opening or of the area of the receiving opening or of the passage opening with respect to the transfer conveyor more evenly over the entire opening.

It is also preferred that the horizontal swivel axis, viewed in a horizontal plane, also runs in the direction of the working or milling direction or conveying direction or in a direction horizontal and perpendicular to the extension of the horizontal swivel axis in a region between the points of the receiving opening that are maximally spaced apart in this direction. This also contributes to the fact that the relative movement, in particular of the receiving opening or the area of the receiving opening or the passage opening with respect to the transfer conveyor, is distributed more evenly over the entire opening. Overall, viewed in the direction of the horizontal swivel axis, the latter is thus preferably arranged within an area whose outer edges are defined in the horizontal direction by the maximum outer points of the receiving opening in the horizontal direction and in vertical direction by the maximum outer points of the receiving opening in vertical direction. Within the region described above for the arrangement of the horizontal swivel axis, the advantages of the invention come to bear more strongly the closer the horizontal swivel axis is arranged in vertical direction and/or in the horizontal direction to the receiving opening of the receiving apparatus on the loading conveyor. The receiving opening of the receiving apparatus thus describes an entrance open upwards in vertical direction for the milled material discharged from the transfer conveyor in the direction of the loading conveyor. The milled material falls through the receiving opening into the receiving apparatus and is guided by it onto the loading conveyor or prevented from falling off the loading conveyor due to the kinetic energy of the discharge from the transfer conveyor. During the fall from the transfer conveyor onto the loading conveyor, the milled material passes at some point a theoretical or virtual (i.e. actually non-existent, but only imaginary) area (passage area), upstream of which the milled material is still outside the receiving apparatus, and downstream of which the milled material is in the receiving apparatus. This area, which in other words describes the entrance, so to speak, for the milled material through the receiving opening into the receiving apparatus, will be referred to below as the entrance area. The entrance area thus designates the extension of a passage opening. In the simplest case, when the receiving opening is in one plane, the entrance area is an entrance plane. However, since other geometries of the receiving opening, for example with a curved, funnel-shaped and/or corrugated opening edge, are also included according to the invention, the more general term entrance area is used. The advantages of the present invention unfold optimally when, according to a preferred embodiment, the horizontal swivel axis is arranged in vertical direction and/or in the horizontal direction, in particular perpendicular to the horizontal swivel axis, at the level of the entrance area of the receiving opening of the receiving apparatus. In this embodiment, the receiving opening of the receiving apparatus moves back and forth the very least during the swiveling of the loading conveyor about the horizontal swivel axis.

Generally, the advantages described above occur with an arrangement of the horizontal swivel axis according to the invention, regardless of how exactly the vertical swivel axis is arranged for lateral swiveling of the loading conveyor. However, in order to also minimize the lateral movement of the receiving opening of the receiving apparatus on the loading conveyor when the loading conveyor is swiveled laterally about the vertical swivel axis, it is preferably provided that the vertical swivel axis runs through the center of the receiving opening of the receiving apparatus in the horizontal plane. In particular, the center describes the geometric center of gravity of the receiving opening projected onto a horizontal plane. Additionally or alternatively, it is also preferred that the vertical swivel axis and the horizontal swivel axis intersect at an intersection point. This intersection point is preferably also located in the center of the receiving opening of the receiving apparatus, in particular defined as indicated above, or in the passage area. In this context, "in the passage area" is to be understood in particular in the sense of "essentially in the passage area" with regard to the position of the horizontal swivel axis and/or the intersection point between the horizontal and vertical swivel axes with respect to the vertical direction, which in the present case can include a range of less than/equal to + and/or −12 cm, in particular less than or equal to + and/or −5 cm, in vertical direction upwards and/or downwards. Additionally or alternatively, "in the passage area" is to be understood with respect to the horizontal direction in the working direction of the ground milling machine or in the conveying direction of the transfer conveyor likewise in particular in the sense of "essentially in the passage area", which can comprise in the present case a range of less than/equal to + and/or −12 cm, in particular less than or equal to + and/or −5 cm, in the horizontal direction to the front and/or to the rear. Similarly, the intersection point between the horizontal and vertical swivel axes preferably lies in this region. Deviations in the horizontal plane perpendicular to the conveying direction are also possible, which would result in an off-center position of the intersection point. However, a central position of the vertical swivel axis, and in particular also of the intersection point, in relation to the width of the receiving opening in the horizontal plane perpendicular to the conveying direction of the transfer conveyor is preferred. In these configurations, the receiving opening of the receiving apparatus moves to a comparatively small extent or relatively evenly relative to the transfer conveyor or the machine frame of the ground milling machine both when the loading conveyor is swiveled about the horizontal swivel axis and about the vertical swivel axis. The transfer of the milled material between the conveyors is therefore particularly successful.

According to a preferred embodiment, the receiving apparatus is arranged on the loading conveyor and is designed as a housing projecting vertically upwards from the loading conveyor or from the upper run of the loading conveyor and closed at least to the sides and in the transport direction of the milled material (in relation to the loading conveyor) to the rear. The receiving apparatus is configured to guide the milled material coming from the transfer conveyor onto the loading conveyor and to hold it there. For this purpose, it is formed, for example, from a stiff, inflexible material such as metal or a hard plastic. The receiving apparatus also has a housing cover which is located at the top in vertical direction and in which the receiving opening is arranged. The housing cover is preferably oriented parallel to the loading conveyor or the transport direction of the loading conveyor. This ensures particularly safe guidance of the milled material onto the loading conveyor.

Generally, different shapes of the receiving opening are conceivable. Preferably, the receiving opening is arranged at the vertically upper end of the receiving apparatus and is in particular polygonal, preferably oval and more preferably essentially circular. These specifications refer, for example, to the edge of the receiving apparatus defining the receiving opening. In particular, said edge runs completely around the receiving opening so that it bounds the receiving opening to the front, especially in the transport direction of the milled material on the loading conveyor. Alternatively, it is also possible for the receiving opening to be open towards the front in the transport direction of the milled material on the loading conveyor. It is advantageous if the transfer apparatus, which will be described in more detail below, can move in the receiving opening of the receiving apparatus as frictionlessly as possible during swivel movements of the loading conveyor. This is achieved in particular with a circular receiving opening. Furthermore, it is preferred if the receiving opening or the edge of the receiving apparatus defining the receiving opening lies in one plane. This plane then concurrently designates the aforementioned entrance area.

The mounting of the loading conveyor on a conveyor suspension of the material transfer apparatus, in such a way that the horizontal swivel axis is located at the previously described position according to the invention, can basically be implemented in various ways. The conveyor suspension refers to the component with which the loading conveyor is mounted on the machine frame of the ground milling machine. In order to structurally enable the displacement of the horizontal swivel axis compared to the prior art, it is preferred that a swivel lever is arranged on the loading conveyor, which projects vertically upwards, and which, on its side remote from the loading conveyor, is mounted on a conveyor suspension so that it can swivel about the horizontal swivel axis. The swivel lever is fixed to the support frame of the loading conveyor and carries a bearing offset upwards from the loading conveyor in vertical direction for swivel connection to the conveyor suspension. This swivel connection defines the horizontal swivel axis. The swivel lever is therefore a component such as an arm, a lug or a support which extends the support frame of the loading conveyor upwards in vertical direction and essentially perpendicular to the longitudinal direction of extension of the loading conveyor in order to enable a positioning of the horizontal swivel axis according to the invention. The conveyor suspension is designed, for example, as a two-armed fork, which at its vertically upper end is preferably mounted on the machine frame of the ground milling machine so that it can swivel about the vertical swivel axis via a conveyor mount. The two arms of the fork-shaped conveyor suspension run downwards in vertical direction and are connected to the loading conveyor on both sides via a respective swivel lever. By shifting the horizontal swivel axis upwards in vertical direction via the swivel levers, the conveyor suspension according to the invention, especially the arms of the conveyor suspension according to the invention, can be made shorter, since it does not have to be guided as far vertically downwards. Due to the shorter conveyor suspension, the apparatus according to the invention is stiffer overall than that of the prior art, since the conveyor suspension can vibrate less due to the shorter arms. In this way, there is the further advantage according to the invention that the loading conveyor swings back and forth less strongly during operation of the apparatus, so that the milled material can be transferred particularly precisely from the loading conveyor to a transport vehicle at the discharge point and, in particular, scattering losses due to the unwanted movements of the loading conveyor are reduced.

Next, the transfer apparatus for transferring the milled material from the transfer conveyor into the receiving opening of the receiving apparatus of the loading conveyor will be discussed. According to a preferred embodiment, the transfer apparatus is arranged stationary with respect to the transfer conveyor and/or the machine frame of the ground milling machine. Thus, when the loading conveyor is swiveled about the horizontal or vertical swivel axis, the loading conveyor also moves relative to the transfer apparatus. The task of the transfer apparatus is to transport or guide the milled material safely and loss-free from the transfer conveyor into the receiving apparatus of the loading conveyor. In order to ensure loss-free transport and also the lowest possible release of dust, it is preferred that the transfer apparatus completely encloses the transport path of the milled material from the transfer conveyor to the receiving apparatus except for a transfer inlet and a transfer outlet, and is designed in particular in the shape of a pipe elbow. The transfer inlet designates an opening of the transfer apparatus through which the milled material coming from the transfer conveyor enters the transfer apparatus. The transfer outlet, in turn, designates an opening of the transfer apparatus through which the milled material leaves the transfer apparatus towards the loading conveyor or the receiving apparatus on the loading conveyor. The overall transfer apparatus therefore forms a transport tunnel through which the milled material is moved. Except for the transfer inlet and the transfer outlet, it is sealed from the outside. As a result, it is not possible—for example, as in the prior art—for the rubber mats hanging down in order to guide the milled material between the conveyors to gap apart when the loading conveyor is swiveled, which would create gaps through which milled material, dust and noise can escape. The transfer apparatus comprises, complementary to the transport path of the milled material within the transfer apparatus, an essentially horizontal section, a curve leading downward in vertical direction, and an essentially vertical section. In the horizontal section, the milled material enters the transfer apparatus via the transfer inlet, is then diverted vertically downwards in the region of the curve, enters the vertical section and then leaves the transfer apparatus via the transfer outlet. The milled material is diverted in the transfer apparatus by gravity and/or by the milled material bouncing off a wall of the transfer apparatus.

To ensure that the milled material is transferred to the loading conveyor with as little loss and as few emissions as possible, it is preferable for the transfer apparatus to guide the milled material not only as far as the receiving apparatus or the receiving opening of the receiving apparatus, but directly into the receiving apparatus. For this purpose, it is preferred that the transfer apparatus has an overlength at the bottom in vertical direction, which is configured such that it projects into the receiving apparatus and extends vertically below the receiving opening of the receiving apparatus. In other words, the transfer outlet located at the lower end of the transfer apparatus in vertical direction is arranged in vertical direction below the receiving opening of the receiving apparatus. The lower end of the transfer apparatus in vertical direction is therefore also located inside the receiving apparatus. There is therefore an overlap region between the transfer apparatus, in particular its overlength, and the receiving apparatus. In this overlap region, the transported milled material is located both in the transfer apparatus and in the receiving apparatus and is enclosed by both apparatuses at least to the rear and to the side. This is a particularly efficient way of preventing milled material, dust or noise from escaping from the material transfer apparatus into the environment.

As described above, when the loading conveyor swivels relative to the transfer conveyor, the receiving apparatus also moves relative to the transfer apparatus. To ensure the tightness of the apparatus and minimize wear, the transfer apparatus and the receiving apparatus are configured complementary to each other, particularly in the overlap region. For example, it is preferably provided that the overlength of the transfer apparatus, in particular at its vertically lower end, is complementary to the receiving opening of the receiving apparatus and in particular polygonal, preferably oval and more preferably essentially circular. If both the transfer apparatus and the receiving apparatus are essentially circular, at least in the overlap region, this results in a particularly advantageous relative mobility of the two apparatuses with respect to each other. In this embodiment, neither swiveling of the loading conveyor about the horizontal swivel axis nor about the vertical swivel axis results in gaps between the transfer apparatus and the receiving apparatus through which milled material could escape to the outside. At the same time, the transfer apparatus, for example, does not, or only to a negligible degree, have to deform during swiveling, so that almost no wear occurs.

In order to maintain the tightness of the material transfer apparatus according to the invention in any swivel position of the loading conveyor, the overlength of the transfer apparatus must be sufficiently long that its transfer outlet is never pulled out of the receiving opening of the receiving apparatus. It is therefore preferred that the overlength is designed in such a way that it still protrudes into the receiving apparatus even if the loading conveyor is swiveled laterally about the vertical swivel axis relative to the transfer conveyor, in particular independently of any swiveling of the loading conveyor about the horizontal swivel axis. For this purpose, the overlength must be sufficiently long, i.e. it must extend sufficiently far downwards in vertical direction. It is particularly preferred that the overlength still protrudes into the receiving apparatus even when the loading conveyor is swiveled by up to 55°, preferably by up to 65°, more preferably by up to 75° and even more preferably by up to 85° about the vertical swivel axis. In such swivel positions of the loading conveyor, the rubber mats hanging down from the transfer conveyor often gap apart in the prior art, creating gaps through which milled material can escape. This cannot happen with the design according to the invention.

To obtain the vertical swivel axis, it is preferably provided that the loading conveyor has a conveyor mount which in particular comprises at least one pin and by means of which the loading conveyor can be mounted on a machine frame of a ground milling machine so as to swivel about the vertical swivel axis relative to the transfer conveyor. The conveyor mount provides the connection between the loading conveyor and the machine frame of the ground milling machine and is, for example, at least partially formed integrally with the conveyor suspension. The conveyor suspension has, for example, at least one and in particular two mounting points lying one above the other in vertical direction, by means of which it is swivel-mounted on the machine frame of the ground milling machine via the conveyor mount. On the other side, the conveyor suspension extends vertically downward to the swivel levers of the loading conveyor, where it is mounted on said levers so as to form the horizontal swivel axis. For example, the conveyor mount comprises at least one bearing eye each on the conveyor suspension and on the machine frame of the ground milling machine, the respective bearing eyes being arranged vertically one above the other. A pin is inserted through both bearing eyes and therefore also extends with its longitudinal direction in vertical direction, so that in this way a particularly simple and stable swivel joint is created for the vertical swivel axis.

Generally, it is possible to make the whole transfer apparatus from rigid material. Compared to the prior art, the transfer apparatus according to the invention has to perform only very minor movements or deformations, if any, even when the loading conveyor is swiveled. However, since such deformations cannot be completely ruled out, it is preferable to make the transfer apparatus at least partially elastic or flexible. For example, it is preferred if the transfer apparatus has a shaping support rack and a cladding that guides the milled material, with the support rack supporting the cladding. Of course, the support rack can also have a milled material-conducting function, so that it is not only used for clamping the cladding. The support rack is formed, for example, from a stiff, inflexible material such as metal or a hard plastic. The cladding, on the other hand, is preferably made of an elastic material, such as plastic or hard rubber. In particular, the support rack ensures that the cladding is clamped with the necessary clear width so that the milled material can be transported through the transfer apparatus.

In order to reduce wear on the transfer apparatus, regions in particular that come into constant and intended contact with milled material during normal operation are formed by the comparatively low-wear support rack. Thus, it is preferred that an edge of the transfer apparatus transitioning from the horizontal to the vertical direction of the milled material transport is formed by the support rack. This edge is located on the inside of the transfer apparatus and in particular in the hollow of the pipe elbow-shaped transfer apparatus. During operation of the ground milling machine, milled material constantly slips from the horizontal portion of the transfer apparatus over the edge into the vertical portion, causing increased abrasion especially at this point. By forming the edge via the support rack, which comprises a harder and therefore less wearable material than the cladding, wear of the transfer apparatus is counteracted.

An advantageous embodiment further provides that the conveyor suspension is connected to a frame of the loading conveyor via joints, in particular comprising joint axes, wherein the joint axes are positioned essentially within the extension of the loading conveyor along the swivel axis, i.e. within the width of the loading conveyor (extension horizontal and perpendicular to the conveying direction). In other words: The conveyor suspension, which is preferably in the form of a rocker, is comparatively narrow and does not embrace the frame of the loading conveyor as a whole, but preferably has holding arms which extend in vertical direction exclusively above the support frame and/or the upper run of the loading conveyor and which engage in retaining lugs arranged on the frame of the loading conveyor and projecting upwards in vertical direction. The joint connection can be made, for example, by means of axle pins, wherein these lie essentially, i.e. preferably with at least 90% of their extension along the swivel axis, within the extension of the frame of the loading conveyor in the direction of the swivel axis.

Finally, the object mentioned at the beginning is also solved by a ground milling machine, in particular a road milling machine, with a material transfer apparatus as described above. All of the mentioned features, effects and advantages of the material transfer apparatus according to the invention also apply mutatis mutandis for the ground milling machine according to the invention. Therefore, to avoid repetitions, reference is made to the corresponding discussion.

BRIEF DESCRIPTION OF THE DRAWINGS

The invention will be explained in more detail below by reference to the embodiment examples shown in the figures. In the schematic figures:

FIG. 4 is a detailed view of the material transfer apparatus from the side;

FIG. 5 is a detailed view of the material transfer apparatus from above;

FIG. 11 is a perspective side view of the material transfer apparatus from the oblique left rear with the loading conveyor swiveled about the vertical swivel axis and swiveled upward about the horizontal swivel axis; and FIG. 12 is a perspective side view of the material transfer apparatus from the oblique left rear with the loading conveyor swiveled about the vertical swivel axis and swiveled downward about the horizontal swivel axis.

DETAILED DESCRIPTION

Figure 1:
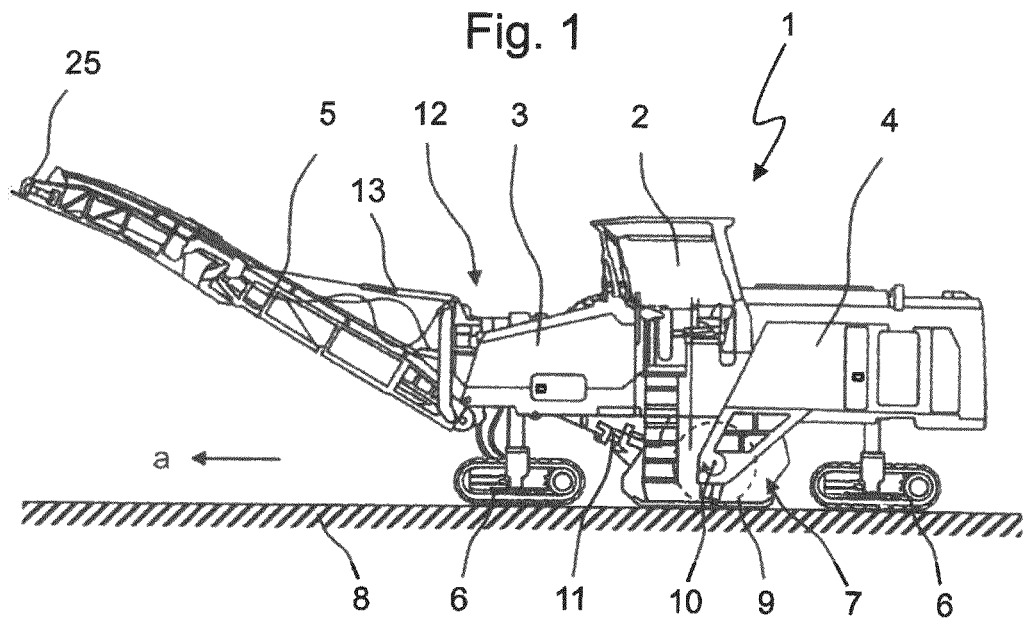
FIG. 1 is a side view of a ground milling machine.

Like parts, or parts acting in a like manner, are designated by like reference numerals. Recurring parts are not designated separately in each figure.

Figure 2:
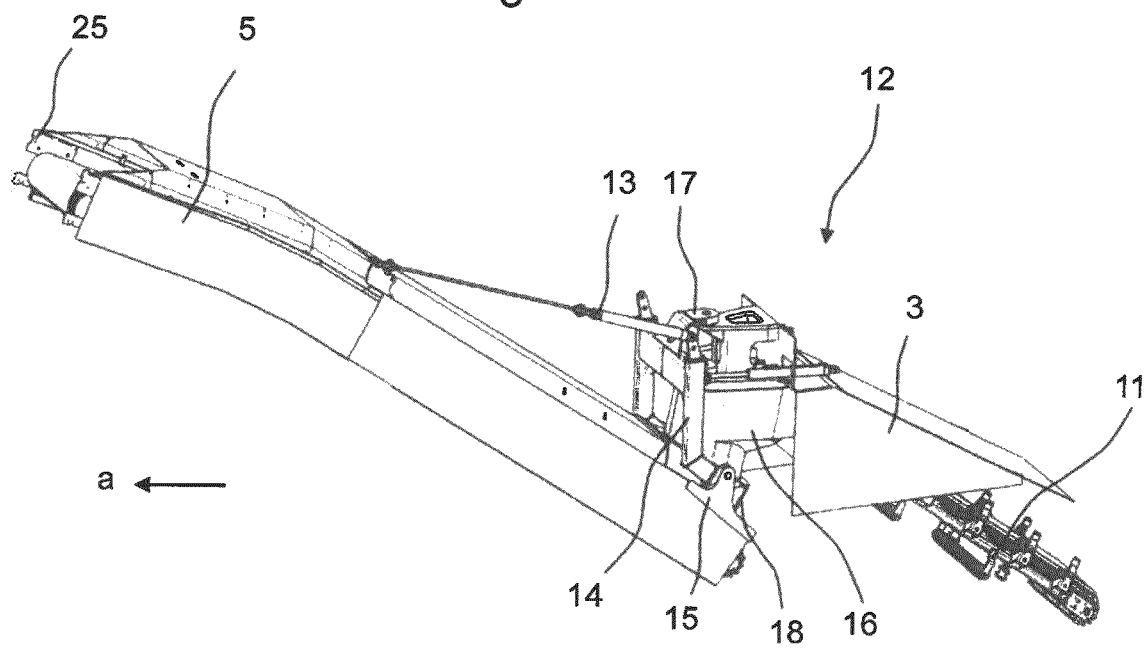
FIG. 2 is a perspective side view of a material transfer apparatus.

FIG. 1 shows a generic ground milling machine 1, in this case a road milling machine of the large milling machine or center rotor milling machine type. However, the invention also relates to other types of ground milling machine, such as rear-loader type milling machines and/or also rear-rotor type milling machines, in particular of the compact milling machine type, as an alternative to the front-loader type milling machine shown in FIG. 1. The ground milling machine 1 has a machine frame 3 with traveling units 6, which are in this case configured as crawler tracks, but could just as well be wheels. An operator controls the ground milling machine 1 from the operator platform 2. A drive motor 4, for example a diesel combustion engine, is provided for propulsion of the ground milling machine 1. During working operation of the ground milling machine 1, the latter moves over the ground 8 with the traveling units 6 in the working direction a. A milling drum 9 is mounted in a milling drum box 7 for rotation about a rotation axis 10. The milling drum 9 is equipped with milling chisels which mill off the ground 8 through rotation of the milling drum 9. Moreover, the ground milling machine 1 includes a material transfer apparatus 12. The essential components of the material transfer apparatus 12 are also shown again in FIG. 2, but there in a configuration according to the invention. The milled material that has been milled and loosened from the ground is ejected and/or shoveled out of the milling drum box 7 through an opening inside the milling drum box 7 that is not shown in FIG. 1, and is received by a transfer conveyor 11, which transports the milled material, for example in the working direction a, to the front. In the front region of the ground milling machine 1, the milled material is transferred from the transfer conveyor 11 to a loading conveyor 5, which transports the milled material to a discharge point 25, where the milled material leaves the loading conveyor and is thrown, for example, onto a transport vehicle, which is not shown, for removal.

Figure 3:
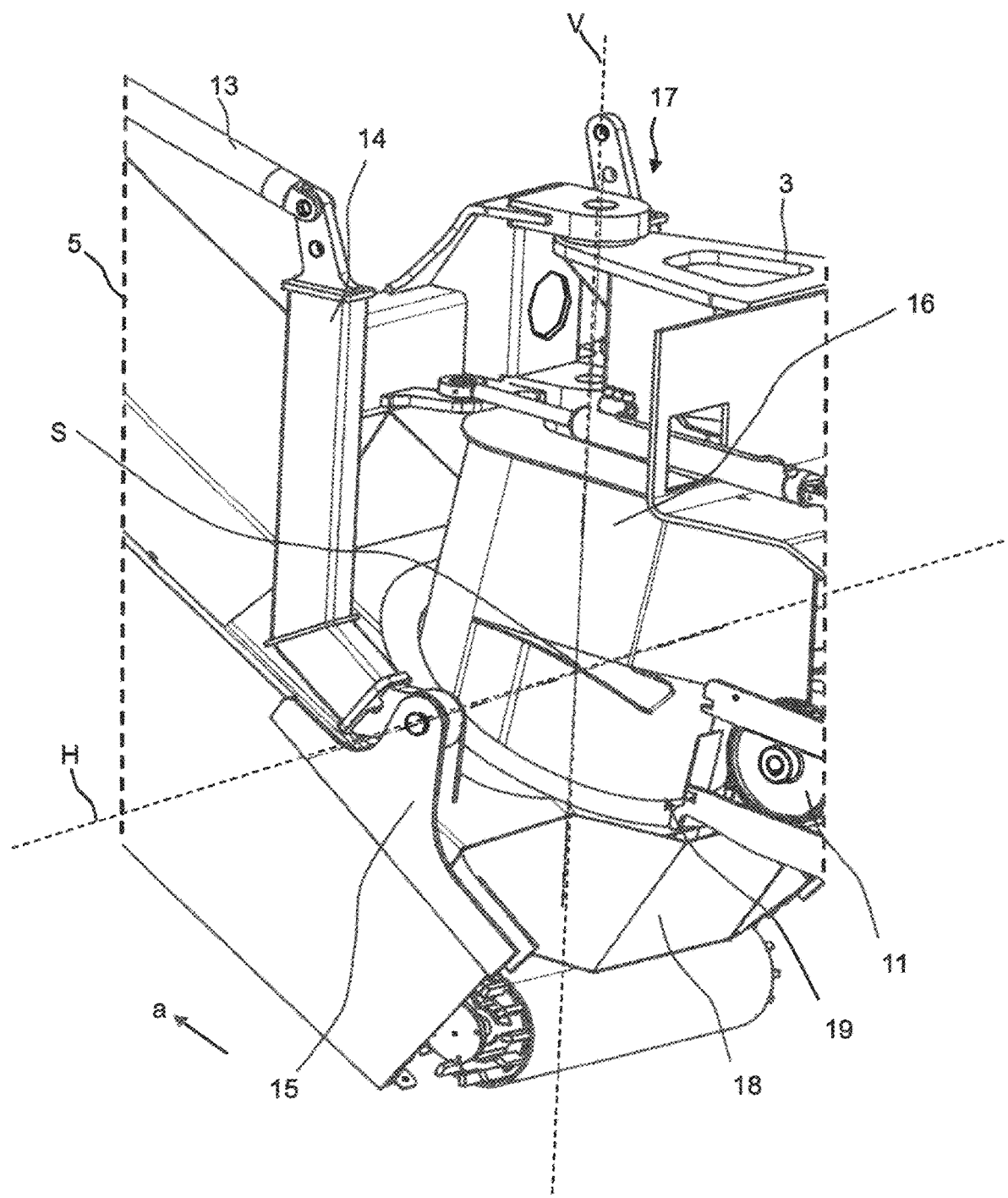
FIG. 3 is a detailed view of the material transfer apparatus from the rear oblique left.

The loading conveyor 5 has a conveyor suspension 14, via which the loading conveyor 5 is connected on the one hand to the machine frame 3 of the ground milling machine 1 at a conveyor mount 17. The conveyor mount 17 is created in such a way that the conveyor suspension 14 and the loading conveyor 5 are mounted on the machine frame 3 so that they can swivel about a vertical swivel axis V (see, for example, FIG. 3), as will be explained in more detail below. For this swiveling about the vertical swivel axis V, an adjusting device is provided which is not shown in more detail and which is operated hydraulically, for example. The loading conveyor 5 is also mounted on the conveyor suspension 14 so that it can swivel in vertical direction about a horizontal swivel axis H (see, for example, FIG. 3), for example by means of a swivel lever 15. An adjusting device 13 is also provided for this swiveling about the horizontal swivel axis H, and may likewise be operated hydraulically, for example. By swiveling the loading conveyor 5 about the horizontal swivel axis H and the vertical swivel axis V, the discharge point 25 can be adapted to different lateral and height positions of the transport vehicle, different relative positions of the ground milling machine and the transport vehicle, etc. for the removal of the milled material. The swivel range about both axes V and H is structurally limited, for example by elements of the machine frame of the ground milling machine, etc. The adjustability of the loading conveyor 5 relative to the rest of the machine enables, for example, the individual adaptation of the discharge point of the loading conveyor 5 to specific loading situations, for example varying transport container heights and/or transport container distances.

The configuration of the material transfer apparatus 12, which ensures that the milled material is transported as loss-free and emission-free as possible, in particular from the transfer conveyor 11 to the loading conveyor 5, is explained in more detail below with reference to FIGS. 3 to 8. According to the invention, only two elements are provided for transporting or directing the milled material from the transfer conveyor 11 to the loading conveyor 5, specifically a transfer apparatus 16, which receives the milled material from the transfer conveyor 11, and a receiving apparatus 18, which receives the milled material from the transfer apparatus 16 and ensures that the milled material is transferred to the loading conveyor 5 as loss-free as possible. A basic idea of the invention is to arrange the transfer apparatus 16, the receiving apparatus 18 as well as the vertical swivel axis V and the horizontal swivel axis H in relation to each other in such a way that an advantageous transfer between the transfer conveyor 11 and the loading conveyor 5 is achieved throughout the operation of the ground milling machine 1, i.e. in all possible swivel positions of the loading conveyor 5 about the axes V, H.

The receiving apparatus 18 is configured as a rigid housing and is arranged on the loading conveyor 5. On its side facing away from the loading conveyor 5, it has a housing cover in which a receiving opening 19 or passage opening is arranged. The receiving opening 19 may be formed as a planar and/or circular recess in the receiving apparatus 18 and may be bounded by an in-plane and/or circular edge. The theoretical area spanning this edge or this receiving opening 19 is referred to as the entrance area 26 (see FIGS. 4 and 8). In the embodiment example shown, the entrance area 26 is a plane. It designates the interface that the milled material must pass in order to be in the receiving apparatus 18. This interface does not have to be flat. In particular, it may also be curved or otherwise three-dimensionally deformed. The area is then determined by connecting straight lines of the opposite end points of the edge bounding the receiving opening, said lines running in the direction of the horizontal swivel axis transverse to the conveying direction of the transfer conveyor. The extension of the entrance area 26 perpendicular to the swivel axis S is designated with 26' in FIG. 4. As can be seen in particular in FIG. 4, the loading conveyor 5 is attached to the machine frame 3 of the ground milling machine 1 in such a way that the horizontal swivel axis H also runs through or along the entrance area 26 or lies in it. In order to shift the horizontal swivel axis H of the loading conveyor 5 further upwards in vertical direction compared with the conventional arrangement at the level of the rear deflection roller of the loading conveyor 5, a swivel lever 15 in the form of support lugs is arranged on the loading conveyor 5, which is rigidly connected to the support frame 15" of the loading conveyor 5. The swivel lever 15 projects in vertical direction above the upper run of the loading conveyor and extends in vertical direction up to essentially the level of the entrance area 26. At the level of the entrance area 26, the swivel lever 15 is swivel-mounted on an arm of the conveyor suspension 14, which is configured as a rocker. Such a design with swivel lever 15 and articulation to an arm of the conveyor suspension 14 is found on both sides of loading conveyor 5 perpendicular to the working direction a, as shown, for example, in FIGS. 5, 6 and 7.

Figure 8:
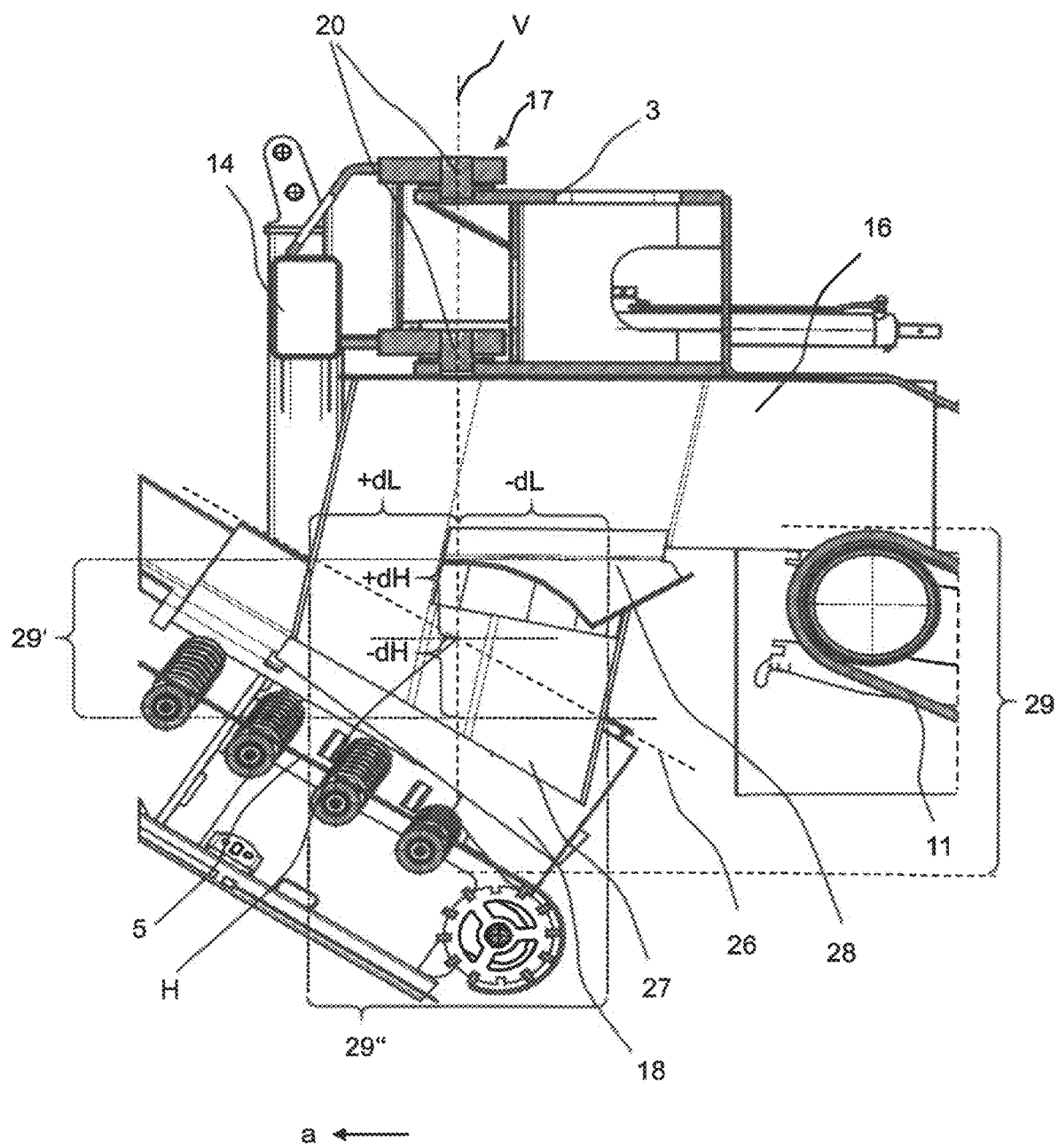
FIG. 8 is a sectional view through the material transfer apparatus from the side.

The two swivel bearings of the swivel levers 15 on the conveyor suspension 14 define the horizontal swivel axis H. Said swivel axis lies, in relation to the vertical direction, in a region 29 (see FIGS. 4 and 8) between the loading conveyor 5 and the transfer conveyor 11. More precisely, the region 29 extends from the rear end of the upper run of the loading conveyor 5 in the working direction a of the ground milling machine 1 or in the conveying direction of the milled material on the loading conveyor 5 to the front end of the upper run of the transfer conveyor 11 in the working direction a of the ground milling machine 1 or in the conveying direction of the milled material on the transfer conveyor 11. The region 29 thus extends vertically downward from the maximum vertical height of the upper run of the transfer conveyor 11 to the minimum vertical height of the upper run of the loading conveyor. According to the invention, the swivel axis S now runs in vertical direction in such a way that it is arranged at the level of the extension of the receiving opening (19) of the receiving apparatus (18) in vertical direction or above it. In FIGS. 4 and 8, 29' designates the extension of the receiving opening 19 in vertical direction. This extension range is defined by the lowest and highest point in vertical direction. In the working direction a or in the transport direction of the milled material on the loading conveyor 5 or in the horizontal direction and perpendicular to the swivel axis, the horizontal swiveling axis H is furthermore preferably arranged in a region 29" (FIG. 8) which is defined by the outer end points of the receiving opening 19 in this direction. Thus, in a virtual reference plane perpendicular to the swivel axis S, a rectangular positioning area defined by the configuration of the receiving opening 19 is obtained (indicated in dashed lines in FIG. 8), within which the swivel axis S is preferably positioned. Ideally, the swivel axis S is positioned such that it intersects the vertical axis V in the opening plane of the receiving opening 19. Due to this arrangement of the horizontal swivel axis H with respect to the receiving opening 19, the receiving opening 19 moves particularly little or comparatively evenly with respect to the transfer conveyor 11 and thus also the transfer apparatus 16 when the loading conveyor 5 swivels about the horizontal swivel axis H, so that, for example, the sealing between the two conveyors can be maintained comparatively well over the entire adjustment range, which ultimately leads to a particularly loss-free transfer of the milled material between the conveyors 11, 5. The fact that the end of the loading conveyor 5 located at the rear in the working direction a or in the transport direction of the milled material, for example in the region of the rear deflection roller, moves more strongly for this purpose than in the prior art is less relevant and does not entail any disadvantages, since there is typically sufficient space for the corresponding movement here anyway.

In particular FIG. 8 illustrates that the arrangement region of the horizontal swivel axis "in the passage area" is preferably selected such that the swivel axis actually lies geometrically exactly in the plane of the passage area. However, the invention also comprises embodiments that have a slight deviation from this plane. This is illustrated in FIG. 8 by the range indications +/−dL in the conveying direction of the transfer conveyor or in the working direction a, and +/−dH in vertical direction with respect to the center of the passage area. "Essentially in the passage area" is accordingly to be understood as meaning that the horizontal swivel axis preferably lies in a range of less than/equal to +dL and/or −dL, where dL means in particular 12 cm, in particular 5 cm, in the horizontal direction to the front and/or to the rear starting from the position of the center of the passage area. Additionally or alternatively, "substantially in the passage area" means that the horizontal swivel axis preferably lies in a range of less than/equal to +dH and/or −dH, where dH means in particular 12 cm, in particular 5 cm, in vertical direction upwards and/or downwards starting from the position of the center of the passage area. In particular, the intersection point of the horizontal and vertical swivel axes preferably lies in this region.

The vertical swivel axis V is defined by the mounting of the conveyor suspension 14 carrying the loading conveyor 5 to the machine frame 3 of the ground milling machine 1. The resulting conveyor mount 17 comprises two respective bearing eyes of the conveyor suspension 14 and the machine frame 3, wherein respective ones of the bearing eyes of the conveyor suspension 14 and the machine frame 3 are arranged vertically one above the other and are rotatably fixed to one another by a vertically extending pin 20 (see FIGS. 6 and 8) inserted through the two bearing eyes. In this way, the conveyor suspension 14 can be swiveled about the vertical swivel axis V together with the loading conveyor 5 and the receiving apparatus 18. The conveyor mount 17 and the vertical swivel axis V are preferably arranged in such a way that the vertical swivel axis V passes through the center of the receiving opening 19. The center of the receiving opening 19 designates in particular the geometric center of gravity of the receiving opening 19 projected onto a horizontal plane, for example the center of the circular receiving opening 19. In this way, the position of the receiving opening 19 in relation to the transfer conveyor 11 and thus also to the transfer apparatus 16 does not change during a swivel movement of the loading conveyor 5 about the vertical swivel axis V, or at least only within a tiny tolerance range. The effect of the invention becomes optimal when, as in the example embodiment shown, the horizontal swivel axis H and the vertical swivel axis V intersect at an intersection point S. This intersection point S is also preferably located in the center of the receiving opening 19 or in the center of the circular receiving opening 19. Due to this common arrangement of the two axes H, V, there is only an extremely small and essentially negligible movement of the receiving opening 19 relative to the transfer conveyor 11 or the transfer apparatus 16, if at all, in the case of any swiveling of the loading conveyor 5.

Figure 6:
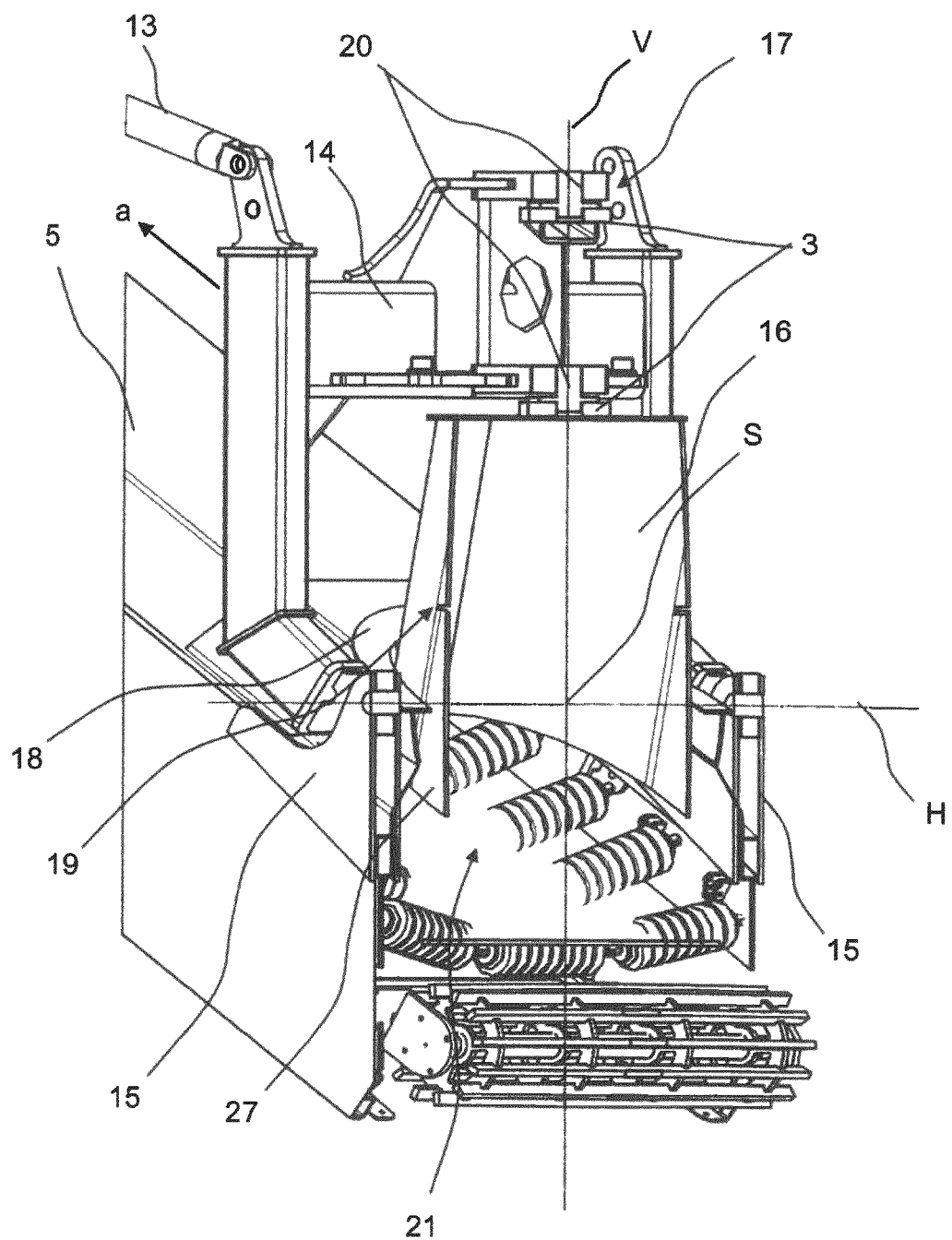
FIG. 6 is a sectional view through the material transfer apparatus in the perspective of FIG. 3.

The embodiment shown is also made particularly compact, for example, by the fact that the transfer apparatus 16 is also fixed in position relative to the loading conveyor 5 on the machine frame 3 at its side lying at the top in vertical direction via the conveyor mount 17 (see also FIGS. 6 and 8). In particular, the transfer apparatus 16 is also fixed to the machine frame 3, specifically at one of the bearing eyes of the machine frame 3, via one of the pins 20 of the conveyor mount 17 together with the conveyor suspension 14. This measure also reduces the number of components required, which lowers costs and reduces wear.

Figure 9:
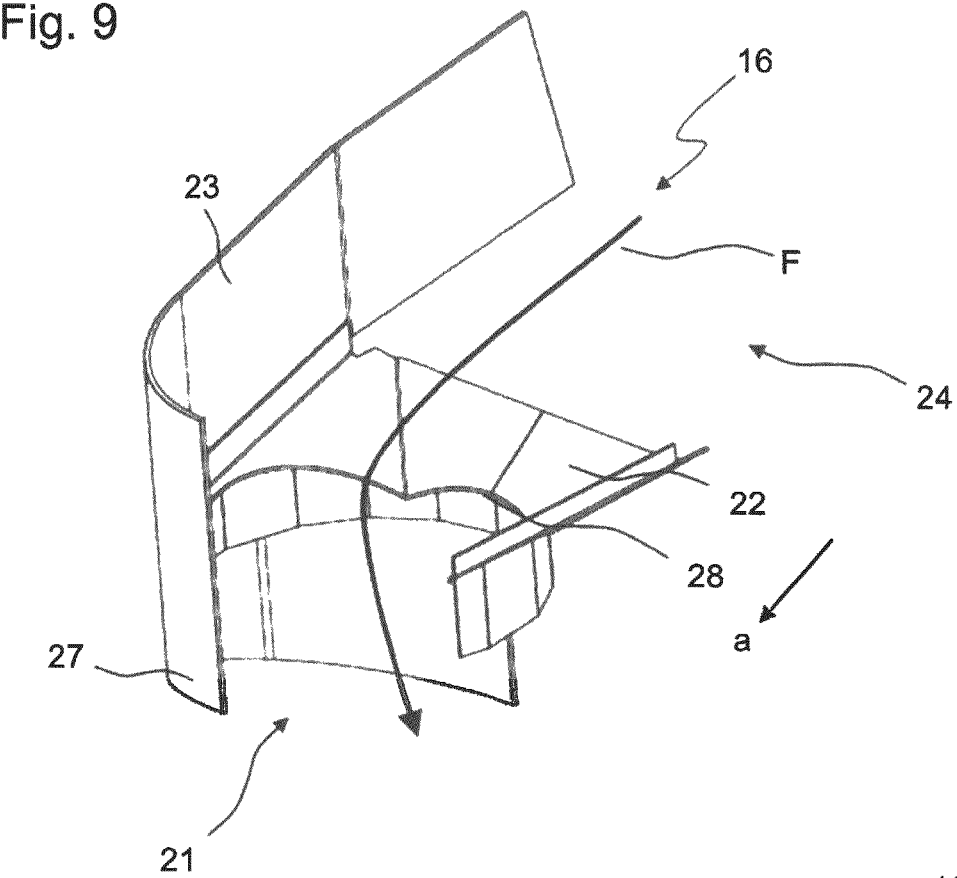
FIG. 9 is a perspective view of the transfer apparatus from the oblique upper left front with the cladding partially removed.
Figure 10:
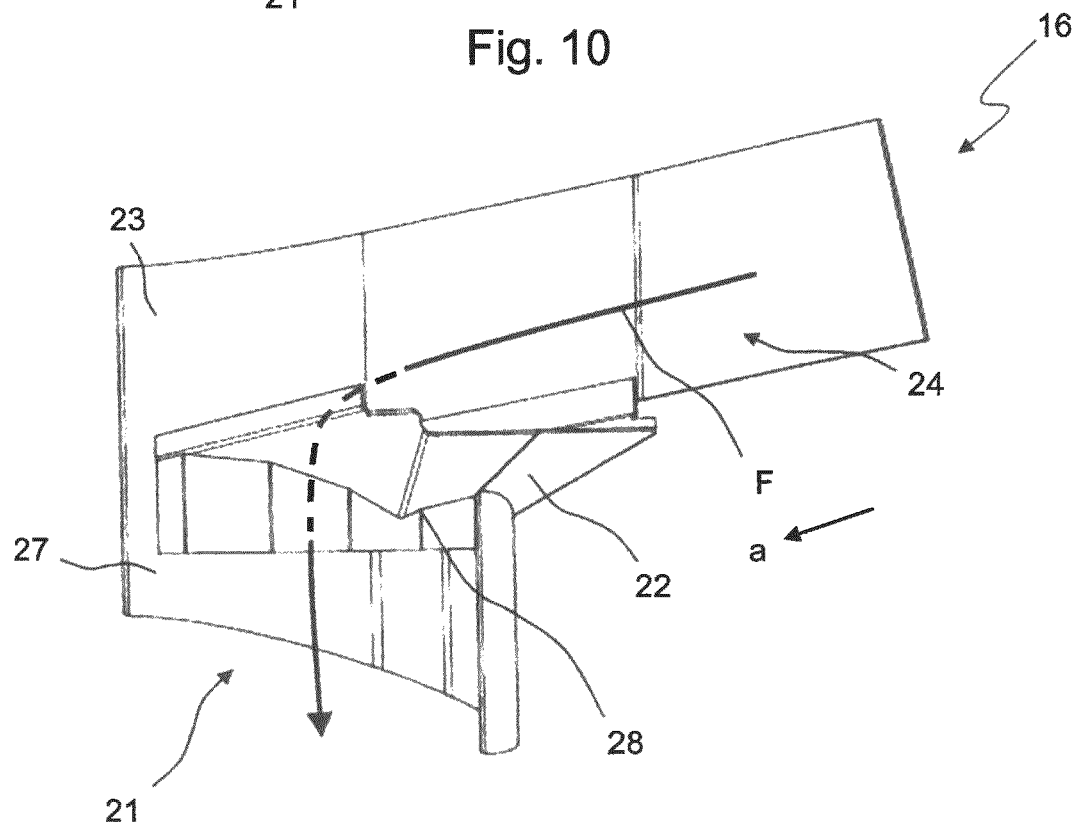
FIG. 10 is a perspective view of the transfer apparatus from the oblique lower left rear with the cladding partially removed.

The structure of the transfer apparatus 16 is explained below with reference to FIGS. 9 and 10. In these figures, parts of the outer casing of the transfer apparatus 16 have been omitted, in particular to be able to illustrate the inner structure. Generally, the transfer apparatus 16 has the shape and function of a pipe elbow. It has a transfer inlet 24 through which milled material coming from the transfer conveyor 11 enters the transfer apparatus 16. Within the transfer apparatus 16, the milled material is then transported in the working direction a to the front and then falls downward at the edge 28 following gravity in vertical direction until it leaves the transfer apparatus 16 through the transfer outlet 21. The direction of transport of the milled material through the transfer apparatus 16 is shown by the arrow F in FIGS. 9 and 10. The transfer inlet 24 and the transfer outlet 21 are the only openings in the transfer apparatus 16, which is otherwise completely closed to the outside. The transfer apparatus 16 comprises a support rack 22 made of a rigid material and an at least partially elastic cladding 23. In particular, the cladding 23 is clamped by the support rack 22 and held in the form of the transfer apparatus 16, and here the fixing of the upper side of the cladding 23 to the pin 20 of the conveyor mount 17 also contributes. Since the vertically lower entrance region of the transfer apparatus 16 and, in particular, likewise the edge 28 are most in contact with the milled material during operation of the ground milling machine 1 and the material transfer apparatus 12, both the entrance region of the transfer apparatus 16, which is located at the bottom in vertical direction, and the edge 28, over which the milled material passes from an essentially horizontal to an essentially vertical movement, are formed or lined on the inside of the transfer apparatus 16 by the support rack 22. Since the support rack 22 is more resistant to wear than the cladding 23, damage to the transfer apparatus 16 is prevented in this way, even during long service lives.

Another important feature of the transfer apparatus 16 is that it has an overlength 27 in the vertical downward direction. The overlength 27 is due to the fact that the transfer apparatus 16 is longer in the vertical downward direction than it would have to be in order to guide the milled material only as far as the receiving opening 19 of the receiving apparatus 18. Due to the overlength 27, the transfer outlet 21 is located in vertical direction below the receiving opening 19 of the receiving apparatus 18. The transfer apparatus 16 thus projects into the receiving apparatus 18 through the receiving opening 19. In particular, the overlength 27 is located in the interior of the receiving apparatus 18. This can also be seen, for example, in FIGS. 6 and 8. The respective position in vertical direction of the receiving opening 19 and, in relation thereto, of the transfer outlet 21 results in an overlap region in which the milled material is located in both the transfer apparatus 16 and the receiving apparatus 18 and is shielded from the external environment by both apparatuses 16, 18 at least laterally and in the working direction a to the rear. The overlap region therefore extends in vertical direction from a lower end defined by the transfer outlet 21 to an upper end defined by the receiving opening 19 or the entrance area 26. The extent of the overlap region and, in particular, the extent of the overlength 27 is selected such that the transfer outlet 21 is always located in vertical direction below the receiving opening 19 or the entrance area 26 of the receiving apparatus 18 in all possible swiveling positions of the loading conveyor 5 about the horizontal swivel axis H and the vertical swivel axis V. It is therefore impossible for the vertically lower end of the transfer apparatus 16 to be pulled out of the receiving apparatus 18 by a swivel movement of the loading conveyor 5. Therefore, during operation of the material transfer apparatus 12 according to the invention, no gaps can occur through which milled material, dust or noise can escape to the outside and endanger bystanders. This is shown in particular in FIGS. 11 and 12, in which the loading conveyor 5 is swiveled laterally about the vertical swivel axis V in each case (by about 65° in the embodiment shown). In FIG. 11, the loading conveyor 5 is also swiveled upward about the horizontal swivel axis H, whereas in FIG. 12 it is swiveled downward. Particularly in these positions with double swiveling, prior art suspensions often diverge so that milled material can escape. As can be seen from the figures, this is efficiently avoided according to the invention, with the material transfer apparatus 12 shown being particularly compact, requiring only a few components, and being particularly inexpensive to manufacture overall.

Figure 7:
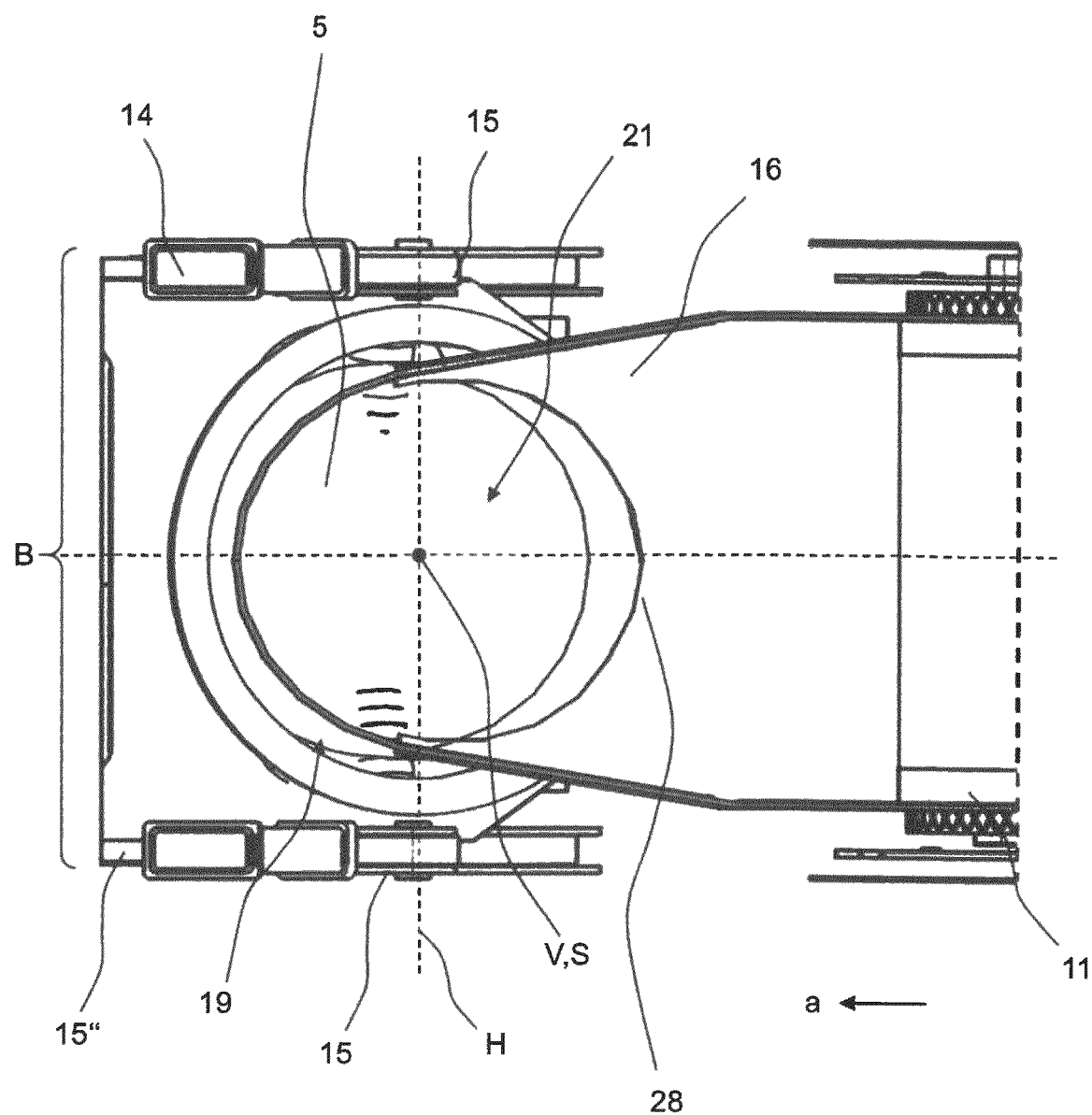
FIG. 7 is a sectional view through the material transfer apparatus from above.

In particular, FIGS. 4, 5 and 7 further illustrate another advantageous aspect of the invention. FIG. 4 shows that the conveyor suspension 14 or holding frame, which can be swiveled relative to the machine frame 3 of the ground milling machine 1, is arranged completely in vertical direction above the upper run of the loading conveyor. The connection to the loading conveyor is made via the swivel levers 15 projecting vertically from the frame of the loading conveyor, to which levers the conveyor suspension 14 is connected via joint pins 15' running in the direction of the swivel axis S. FIG. 5 in particular shows that the conveyor suspension and especially the joint axes are located essentially within the width B (FIG. 7) of the loading conveyor or the extension of the support frame 15" of the loading conveyor in the direction of the swivel axis S. In contrast to conventional conveyor suspensions, this one thus does not embrace the frame of the loading conveyor, but is formed by the arrangement exclusively above the frame of the loading conveyor. This results in a comparatively narrow overall configuration because the joint elements between the conveyor suspension and the frame of the loading conveyor no longer lie one behind the other as seen in the direction of the swivel axis, but side by side or one above the other in vertical direction. This is also only possible with the aid of the elevated swivel axis described above.

What is claimed is:

1. A material transfer apparatus for transferring milled material for a ground milling machine, comprising:
    a loading conveyor for discharging the milled material;
    a transfer conveyor for transporting the milled material onto the loading conveyor; and
    a transfer apparatus for transferring the milled material from the transfer conveyor into a receiving opening of a receiving apparatus of the loading conveyor;
    wherein the loading conveyor is mounted such that the loading conveyor is swivelable about a vertical swivel axis and about a horizontal swivel axis;
    wherein the horizontal swivel axis is arranged above the loading conveyer in a vertical direction in a vertical plane in which the horizontal swivel axis is located; and
    wherein the horizontal swivel axis is arranged in a region in vertical direction defined between a lower maximum point of the receiving opening in the vertical direction and an upper maximum point of the receiving opening in the vertical direction or above.

2. The material transfer apparatus according to claim 1, wherein the horizontal swivel axis is arranged in the vertical direction above an upper run of the loading conveyor and below an upper run of the transfer conveyor.

3. The material transfer apparatus according to claim 1, wherein the horizontal swivel axis is arranged in the vertical direction at a level of a cross-sectional entrance area of the receiving opening of the receiving apparatus.

4. The material transfer apparatus according to claim 1, wherein the vertical swivel axis and the horizontal swivel axis intersect at an intersection point.

5. The material transfer apparatus claim 1, wherein the receiving apparatus is arranged on the loading conveyor and is configured as a housing which projects vertically upwards from the loading conveyor and is closed at least to its sides and in a transport direction of the milled material to a rear.

6. The material transfer apparatus according to claim 1, wherein the receiving opening is arranged at a vertically upper end of the receiving apparatus.

7. The material transfer apparatus according to claim 6, wherein the receiving opening is circular.

8. The material transfer apparatus according to claim 1, wherein a swivel lever is arranged on the loading conveyor, wherein the swivel lever projects vertically upwards and is mounted on a conveyor suspension on a side of the swivel lever facing away from the loading conveyor so as to swivel about the horizontal swivel axis.

9. The material transfer apparatus according to claim 1, wherein the transfer apparatus completely encloses a transport path of the milled material from the transfer conveyor to the receiving apparatus except for a transfer inlet and a transfer outlet and is configured in a shape of a pipe elbow.

10. The material transfer apparatus according to claim 1, wherein the transfer apparatus has an overlength in the vertical direction at a bottom, wherein the overlength projects into the receiving apparatus and extends vertically below the receiving opening of the receiving apparatus.

11. The material transfer apparatus according to claim 10, wherein the overlength, at a vertically lower end, is complementary to the receiving opening of the receiving apparatus.

12. The material transfer apparatus according to claim 10, wherein the overlength is configured such that the overlength still projects into the receiving apparatus even when the loading conveyor is swiveled laterally about the vertical swivel axis relative to the transfer conveyor.

13. The material transfer apparatus according to claim 12, wherein the overlength still projects into the receiving apparatus even when the loading conveyor is swiveled by up to 55°.

14. The material transfer apparatus according to claim 12, wherein the overlength still projects into the receiving apparatus even when the loading conveyor is swiveled laterally about the vertical swivel axis relative to the transfer conveyor, independently of a swiveling of the loading conveyor about the horizontal swivel axis.

15. The material transfer apparatus according to claim 1, wherein the loading conveyor has a conveyor mount by which the loading conveyor is mountable on a machine frame of a ground milling machine such that the loading conveyor is swivelable about the vertical swivel axis with respect to the transfer conveyor.

16. The material transfer apparatus according to claim 15, wherein the conveyor mount comprises at least one pin.

17. The material transfer apparatus according to claim 1, wherein the transfer apparatus has a shaping support rack and a lining for guiding milled material, the shaping support rack supporting the lining.

18. The material transfer apparatus according to claim 17, wherein an edge of the transfer apparatus is formed by the shaping support rack.

19. The material transfer apparatus according to claim 1, wherein the material transfer apparatus has a conveyor suspension, and joint axes of the conveyor suspension are positioned in the vertical direction above a support frame and/or an upper run of the loading conveyor, within a width of the support frame of the loading conveyor.

20. The material transfer apparatus according to claim 1, wherein the material transfer apparatus is disposed on a ground milling machine.

* * * * *